Dec. 6, 1938.  F. C. WARNE  2,138,948
WIDE SINGLE TRACTOR DISK HARROW
Filed Oct. 20, 1936  6 Sheets-Sheet 1

INVENTOR
F. C. Warne
BY
ATTORNEY

Dec. 6, 1938.   F. C. WARNE   2,138,948
WIDE SINGLE TRACTOR DISK HARROW
Filed Oct. 20, 1936   6 Sheets-Sheet 2

INVENTOR
F. C. Warne
BY
ATTORNEY

Dec. 6, 1938.  F. C. WARNE  2,138,948.
WIDE SINGLE TRACTOR DISK HARROW
Filed Oct. 20, 1936  6 Sheets-Sheet 3

INVENTOR
F.C.Warne
ATTORNEY

Dec. 6, 1938.  F. C. WARNE  2,138,948
WIDE SINGLE TRACTOR DISK HARROW
Filed Oct. 20, 1936  6 Sheets-Sheet 5

INVENTOR
*F.C.Warne*
BY
ATTORNEY

Dec. 6, 1938.   F. C. WARNE   2,138,948
WIDE SINGLE TRACTOR DISK HARROW
Filed Oct. 20, 1936   6 Sheets-Sheet 6

INVENTOR
F. C. Warne
BY
ATTORNEY

Patented Dec. 6, 1938

2,138,948

UNITED STATES PATENT OFFICE 2,138,948

WIDE SINGLE TRACTOR DISK HARROW

Frederick C. Warne, Mansfield, Ohio, assignor to Farm Tools, Inc., Mansfield, Ohio, a corporation of Indiana Application October 20, 1936, Serial No. 106,517

11 Claims. (Cl. 55—81)

This invention relates to improvements in disk harrows and is particularly directed to a sectionalized disk harrow of that type in which an exceptionally wide single tractor disk harrow structure is attained by extending the length of the disk harrow on each side of the draft element through the provision of an extension gang arranged for attachment to the main gang.

In this type of harrow the sectionalized harrow unit must at times be shortened up for various reasons. One of these is to permit the passing through gates and another and important reason is to provide proper harrowing under varying soil conditions, i. e., if the soil is hard, then with the harrow unit at full length, the disks will not penetrate deep enough. The harrow unit must therefore be shortened by removing the extension gang and it is practicable under these conditions to also increase the weight on the main gang by loading the extension on to the same. If, on the other hand, the soil is very loose or sandy then, with the harrow unit at full length, the disks will penetrate so deep that traction cannot be obtained by the draft implement sufficient to pull same. If the gangs are given a less angle to prevent deep cutting, the soil will not be properly worked. Here again, therefore, the unit must be shortened to lighten the load.

Sectionalized harrows of the above stated type have heretofore been designed but none, to my knowledge, have been adaptable to successful operation under all of the above mentioned variable conditions.

As far as I know, all types heretofore designed have had the extension gangs attached at a fixed point to the main gang, one type being adapted to have the extension gang folded bodily upward and over onto the main gang. This presents a laborious operation and when once the extension gang is folded over and onto the main gang, it always comes to rest at a fixed point so that the weight thereof cannot be distributed at selective points on the top of the main gang, which is many times most desirable to effect the best operation of the harrow disks. Furthermore, such a folding over of the extension gang onto the main gang cannot afford much relief from the loose soil condition mentioned above since the added weight must necessarily tend to aggravate rather than alleviate the draft trouble encountered in such loose soil conditions.

One of the principal objects of my invention therefore is to provide such a sectionalized disk harrow having these extension gangs in which the extension gangs are detachably connected with the main gangs so that they may be readily completely detached and removed from the main gangs and set aside or, if desired, may be loaded with ease on the main gang, and being then capable of being set and carried at selective points along the length of the main gang to distribute the weight to effect the best harrowing action.

Another object of my invention is to provide means by which the extension gang frames may be rigidly attached to the main gang frames when the extension disk gang is in operative position to obviate relative movement between the two in any direction and thus minimizing the strains on the interconnected parts.

A still further object of the invention is to provide a spring break levelling device to overcome the tendency of the inner ends of the main gang frames to raise when disking level soil, but which will at the same time allow such inner ends of the main gang frames to raise freely but under spring tension when the implement is disking on a ridge.

The extension disk gang may be rigidly attached to the main disk gang when in operative position, thus preventing undue strain on the extension or the main disk in any direction.

Also, the extension disk gang may be readily completely detached from the main gang frame when the parts are in operative position and completely removed therefrom and set aside from the main frame without in any way affecting the continued operation of the main gang.

Further, the extension disk gang may be readily detached from operative co-related position with the main gang and easily loaded on the top of the main gang and when so loaded, may be set to any selective position on top of the main gang for the purpose of properly distributing the weight along the main gang frame to conform to desired harrowing action in different types of soils.

These several objects I accomplish by means of the very much simplified and inexpensive, but very effective combination and arrangement of parts, as will appear from a perusal of the following specification and drawings, in the latter of which—

Figure 1:
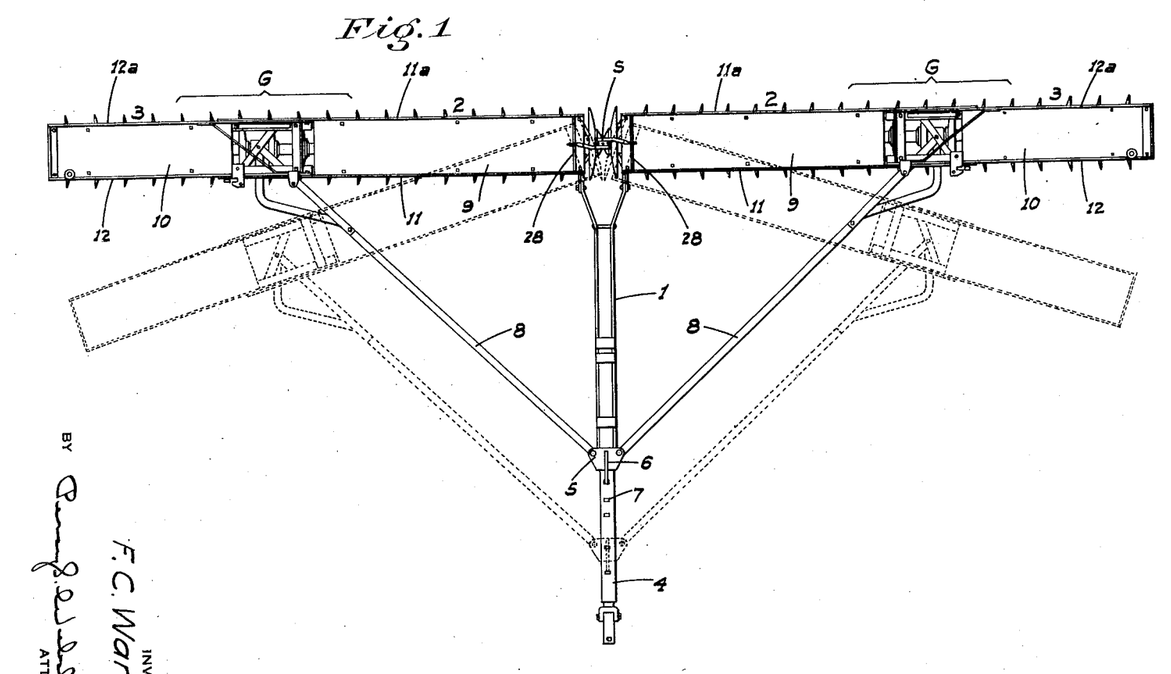
Fig. 1 is a top plan view of one of my complete sectionalized harrows, showing the extensions fully extended and in operative position in straight line working position, and the dotted lines showing the same set at its angled working position.
Figure 2:
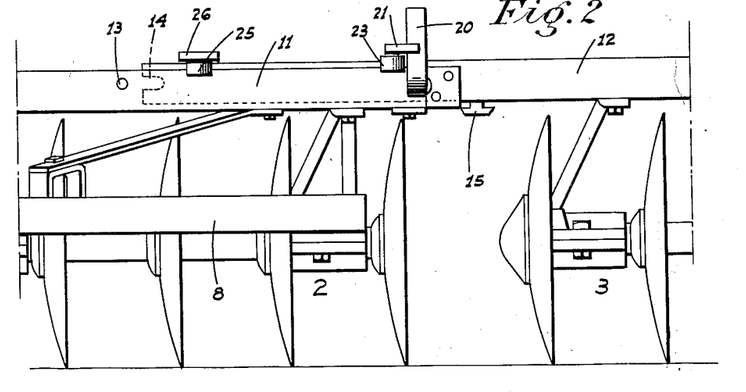
Fig. 2 is a fragmentary view showing the adjacent ends of the main gang and the extension gang as they appear just prior to being rigidly attached together.
Figure 3:
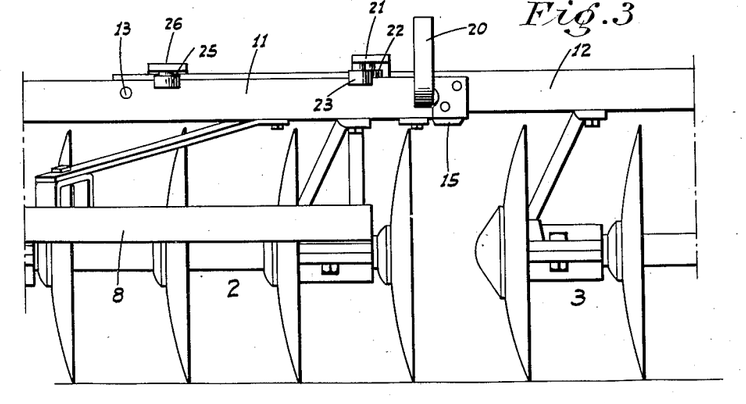
Fig. 3 is a view similar to that shown in Fig. 2 after the main gang and extension gang have been rigidly attached together.
Figure 4:
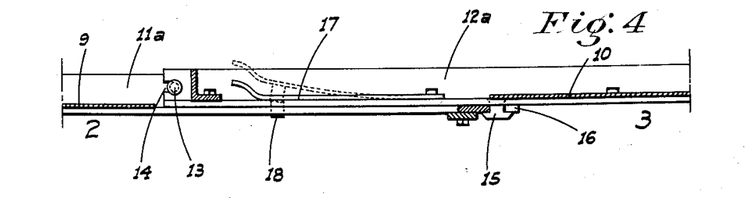
Fig. 4 is a vertical sectional view through the adjacent ends of the main gang frame and the extension gang frame showing how the parts are locked together.

Referring now more particularly to the characters of reference on the drawings, Fig. 1 is a top plan view of one of my complete sectionalized harrows. This constitutes the main draft fork 1, to each of the branches of which is connected one of the sectionalized harrow gang units, marked generally in the drawings as G. Each gang unit G comprises the main disk gang 2 and the extension disk gang 3, the particular construction and inter-locking connection between which main and extension gangs will be later described in detail.

Associated with the draft fork 1 are the draft connections for the harrow, which draft connections are associated solely with the main disk gangs 2 so as to readily permit the detachment and separation of the extension disk gangs 3, as will be later described, without affecting the normal operation of the main disk gangs alone.

These draft connections comprise a draft bar 4 which is slidably mounted through a locking block 5, having a latch 6 adapted to engage notches or orifices 7 in the draft bar 4 to lock the member 5 and the draft bar together. The draft bar 4 is also adapted for telescopic movement through the draft fork 1. Divergent draft bars 8 are pivotally connected with the corner of the locking block 5 and also are suitably connected with the outer ends of the main disk gangs 2.

When it is desired to set the disk gangs G at an angle as shown by dotted lines in Fig. 1, the tractor to which the disk harrow is connected is backed to slide the draft bar 4 through the block 5 and draft fork 1 until the latch 6 engages such of the notches 7 as may be selected. Then, with the forward pull of the tractor, the draft fork 1 remains stationary and the draft bar 4 is pulled forward telescoping through the fork 1 and carrying with it the locking block 5 in the position at which said block 5 is locked to the draft bar 4. This then pulls on the draft bars 8 connected with the outer ends of the main gangs 2 which functions to pull the gangs into angle.

When it is desired to again straighten the gangs G, the latch 6 is disassociated from the notch 7 and the drag of the soil against the outer ends of the gangs G pulls them back into straight position, the block 5 then sliding freely over the draft bar 4 as will be apparent.

Between the adjacent inner ends of the gangs G is provided a spring break mechanism S which while allowing the gangs to remain truly horizontal when plowing over level ground permits of such inner ends raising slightly under spring checked control when the harrow is operating on a ridge. This spring break mechanism will be described more in detail at a further point in this specification, but it is quite an essential element in connection with the wide harrow construction resulting from the addition to the main gangs 2 of the extension gangs 3.

I will now describe in detail the combination of parts by which I accomplish the objectives of so connecting the extension disk gang 3 with the main disk gang 2 that the said extension disk gang may be optionally rigidly attached to the main gang 2, completely detached therefrom and set aside, or detached from operative connection therewith and mounted on the top thereof at any selected point. I will merely make this description as applying to one of the gangs G, it being understood that both gangs are of similar construction.

The main gang 2, as is usual, comprises a top frame 9 and the extension gang 3 has a like top frame 10. The frame 9 is substantially channel-shaped so that it has upstanding side flanges 11 and 11a and the frame 10 has similar upstanding side flanges 12 and 12a. The frame 10 is slightly narrower than the frame 9 so that when the extension gang 3 is to be attached to the main gang 2, the flanges 12 and 12a of the frame 10 may be telescoped within the flanges 11 and 11a of the frame 9 as shown clearly in Figs. 1 to 4, inclusive.

When the two frames are thus telescoped together and the extension gang 3 is to be rigidly connected to the main gang 2, pins 13 on the flanges 11 and 11a receive notches 14 in the ends of the flanges 12 and 12a, and headed lugs 15 are received into notches 16 in the outer end of the bottom of frame 9. These two cooperating pin and notch assemblies prevent any vertical movement between the extension gangs 3 and the main gangs 2 and any lateral strains are efficiently provided against by the interlocking occasioned through the telescoping of the flanges 11, 11a and 12 and 12a, respectively. When the parts are thus completely inter-locked, they are held against displacement relative to each other by means of a latch mechanism which comprises a spring latch element 17 mounted on the frame 10 and having a latch pin 18 projecting between registering orifices 19 in the bottoms of the frames 9 and 10, respectively. This pin holds the parts together in the relationship above indicated until it is desired to separate them.

When separation of the extension gang 3 from the main gang 2 is desired, the latch spring 17 is lifted, pulling the pin 18 from the orifices 19 and while this pin is thus held out of the orifices, the extension gang 3 may be pulled outwardly to disassociate the pins 13 from the notches 14 and the pins 15 from the notches 16, whereupon the extension gang may be completely lifted out of engagement with the main gang and set aside; and the balance of the harrow may then be operated in its thus narrowed form.

If it is not desired to completely detach the extension gang 3 from the main gang 2, I have provided a means by which the extension gang may be loaded to any selected point on top of the main gang and I will now describe the relative arrangement of parts by which this latter objective may be attained.

On the flange 11 near the outer end of the main frame 9 is provided an upstanding stop and guide finger 20. On the top frame 10 at a point which is closely adjacent this guide finger 20 when the frames 9 and 10 are completely interengaged, is provided a strap 21 which overhangs the adjacent flange 11. On the under side of this strap 21 are two spaced rollers 22 and 23, respectively. When the strap 21 is turned to vertical position with a rocking movement of the frame 10, these rollers 22 and 23 are adapted to ride on the top and bottom edges of the flange 11, as shown quite clearly in Figs. 6 and 7.

Figures 5, 6, 7:
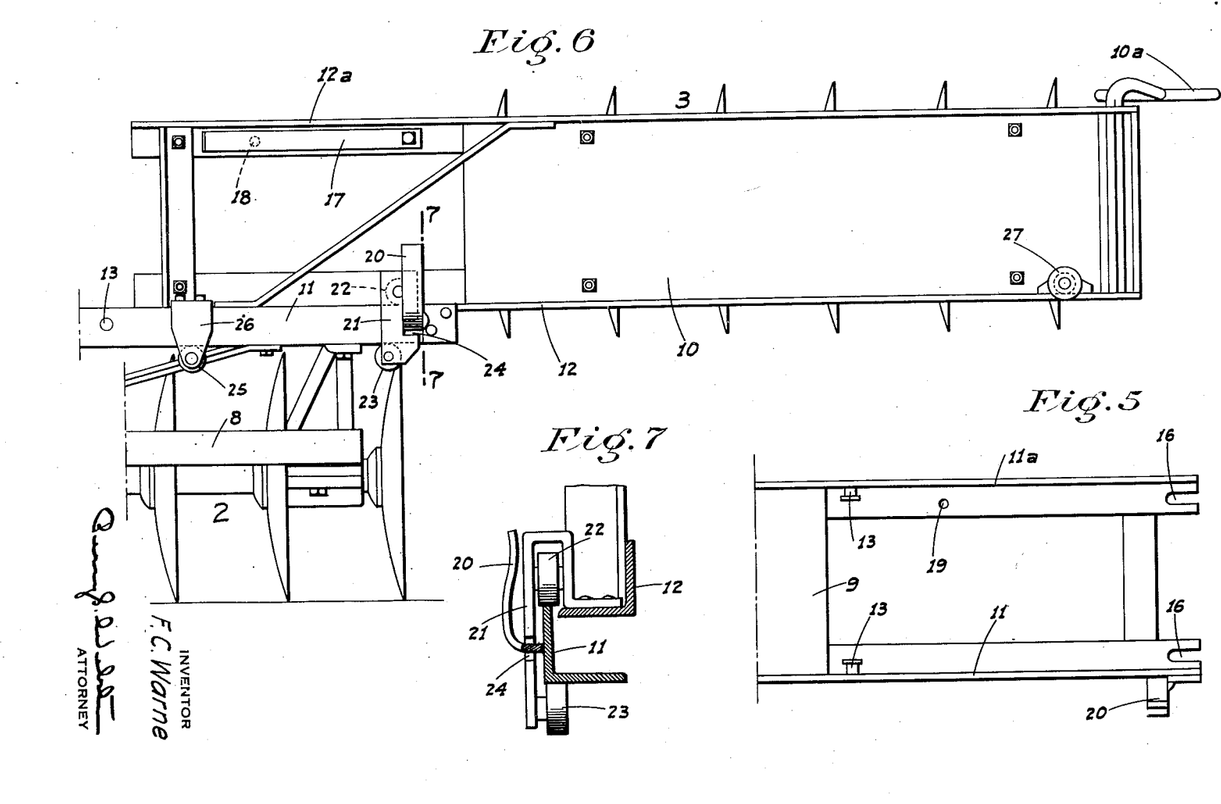
Fig. 5 is a top plan view of the outer end of the main gang frame.
Fig. 6 is a front elevation of the outer end of the main gang and of one complete extension gang, showing the position of the latter when it has been first detached from the main gang and rocked in a vertical plane ready to be selectively positioned at a selective point along the top of the main gang frame.
Fig. 7 is a fragmentary cross section on the line 7—7 of Fig. 6.
Figure 8:
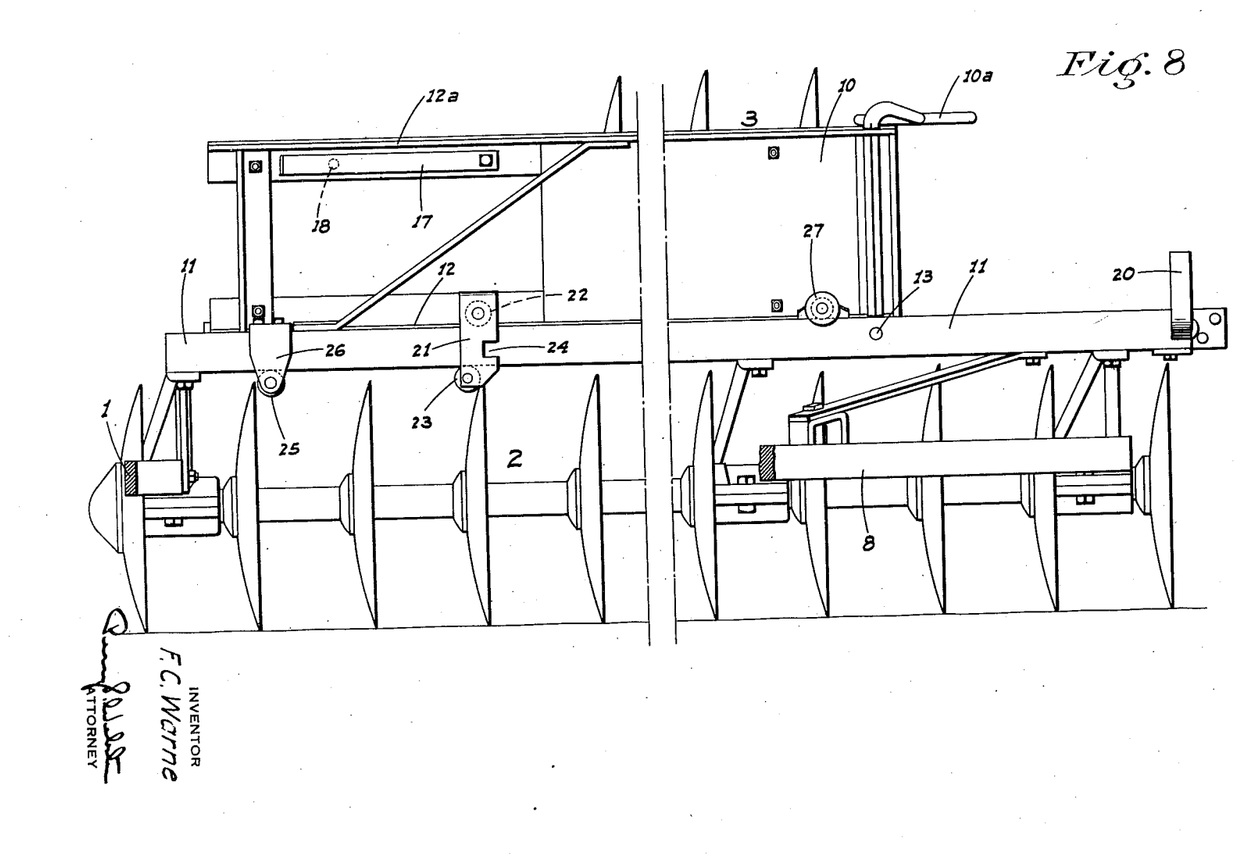
Fig. 8 is a front elevation of the main gang and of the extension gang partly broken through and showing how the extension gang may be positioned at some selected point along the top of the main gang frame.
Figure 9:
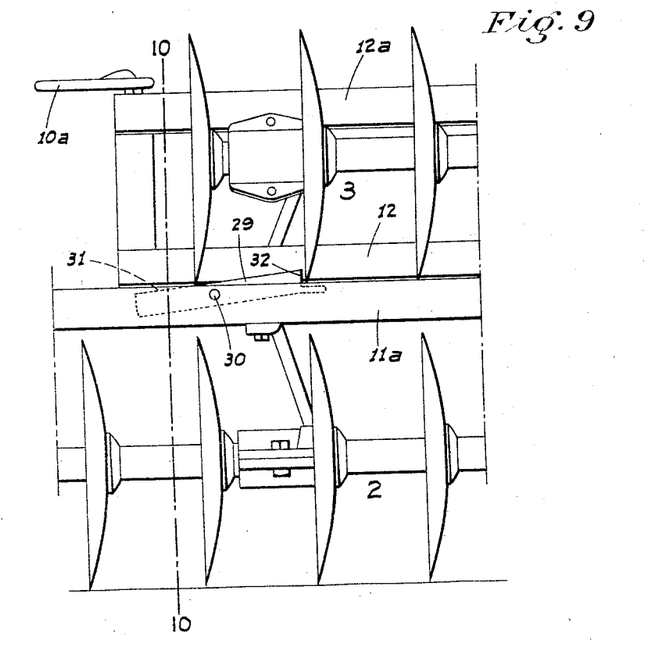
Fig. 9 is a front elevation of a fragmentary portion of the main gang frame showing the extension gang frame mounted on top thereof and showing my novel automatic lock means for preventing longitudinal displacement of the extension gang relative to the main gang.

In one edge of the strap 21 is a slot 24. When the pins 13 and 15 have been disassociated from the notches 14 and 16 by direct longitudinal pull of the frame 10 relative to the frame 9, the slot 24 engages the stop and guide finger 20. By then rocking the frame 10 through the medium of any suitable handle 10a to a position at right angles from normal working position, as shown in Fig. 6, the slot 24 working over the guide finger 20 guides the rollers 22 and 23 into position along the upper and lower edges of the flange 11 so that the frame 10 may then be rolled along on the flange 11 to carry the extension gang into any selected position on top of the main gang. This rocking action is facilitated by means of an additional roller 25 on a strap 26 overhanging the flange 11 in the inner end of the frame 10, and which roller moves to a position under the flange 11 when the frame 10 is rocked to the position shown in Fig. 6. This rolling action is likewise further facilitated by another roller 27 which is mounted on the flange 12 near the outer end of the frame 10 and which roller also rides on the flange 11 as the frame 10 is moved along to flange 11. The cooperation of the rollers 22 and 23 and of the rollers 25 and 27 prevent any vertical or lateral dislodgment of the frame 10 from the flange 11 when the extension gang has been positioned on top of the main gang. I have also provided an automatic self-locking means to prevent longitudinal displacement of the extension gang relative to the main gang when the former is located on top of the latter, which automatic mechanism I will now describe in detail.

This automatic mechanism of course relates to the displacement of the extension disk gang off of the free outer end of the main gang frame, since of course the flange 28, which is normally in the inner end of the main gang frame, would prevent displacement in that direction but the outer end of the main gang frame is of course freely open to permit of the telescoping action between the two frames, as above described. Therefore, it might be possible that with the vibration and jiggling of the main frame in the plowing operation, the auxiliary frame might work along and drop off this outer end. My automatic lock mechanism is therefore interposed at a point which would be substantially the outer point of the extension disk gang when it was located on top of the main gang at its furthest point toward the inner end of said gang. This lock mechanism is, as will appear, then operable to lock the extension gang at any selected point along the length of the top of the main gang.

This automatic lock mechanism is very simple in structure but quite effective in operation and comprises a rocking latch bar 29 pivoted to the flange 11a as at 30. This bar is overweighted on one side and is so positioned that this overweighted end will normally tend to lift the opposite end 31 of the lever so that it will project slightly above the top edge of the flange 11a. The overweighted end of the bar 29 is provided with a notch 32, the end face of which will be lifted above the top edge of the flange 11a as the projecting end 31 is pressed down to a level below the top edge of such flange.

When the extension disk is being rolled along the flange 11 to position it on top of the main gang, the edges of the disks of such extension gang are held slightly away from the flange 11a to prevent scraping of the same, and incidentally this causes them to clear the normally projecting end 31 of the bar 29. When, however, the extension gang has been moved to the point selected as that at which it will rest upon the main gang, the edges of the disks of the extension gang will then be permitted to rest on the flange 11a. If, therefore, from any cause the extension gang should tend to shift from its selected position on the top of the main gang, one of the disks will engage the projecting point 31 and cause the bar 29 to move on its pivot 30 and lift the notch 32 into the path of the next succeeding disk and thus effectually lock the extension gang against any further longitudinal movement relative to the main gang. It will be apparent that this action will take place between two adjacent gangs, irrespective of the selected position at which the extension gang may be allowed to rest on top of the main gang, thus definitely holding it in such selected position.

It may be well at this point to state that this possibility of positioning and maintaining the extension gang at a selective position on top of the main gang is one of the important features of my invention, since by this means the weight of the same may be placed at various points along the top of the main gang to cause the latter to effect the desired disking action which may vary with different kinds of soil to which the harrows are operating. As was pointed out in the preamble to this specification, another of the objectives of the invention has been to provide a spring break for the inner ends of the main disk gangs to offset the natural tendency for the inner ends of the main gang frames to rise when the harrow is in operation, which tendency is severely augmented when these extra wide sectionalized harrows are used, but which functions to allow this lifting action when a ridge is encountered, since under the latter conditions, it is desirable to allow the outer ends of the disk gangs to drop freely to conform to the soil and thus effect uniform disking on a ridge.

My improved spring break construction, while very simple in construction, is highly effective in maintaining the gangs level on level soil and allowing a ready dropping of the outer ends thereof when a ridge is encountered.

Figure 10:
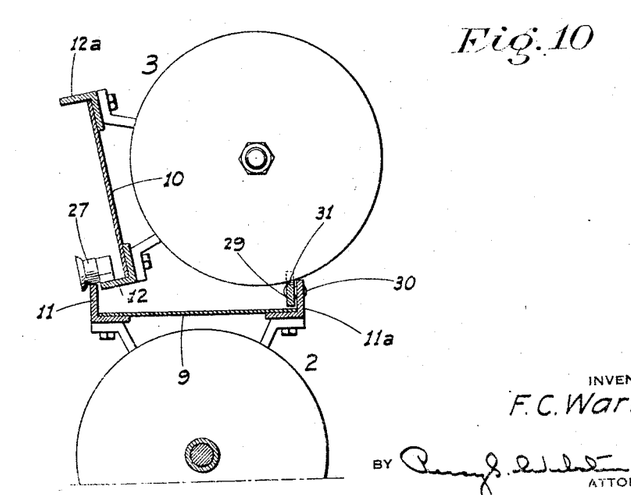
Fig. 10 is a cross section on the line 10—10 of Fig. 9.
Figure 11:
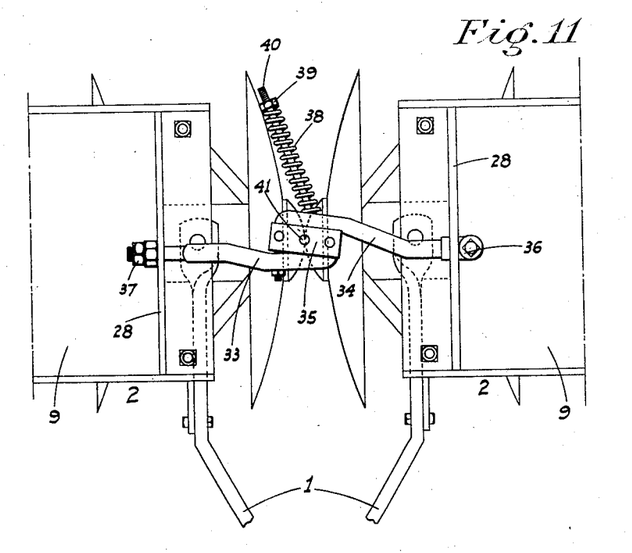
Fig. 11 is a top plan view of the spring break arranged between the two complete sectionalized harrow elements and showing the position assumed by the latter when they are in level position.
Figure 12:
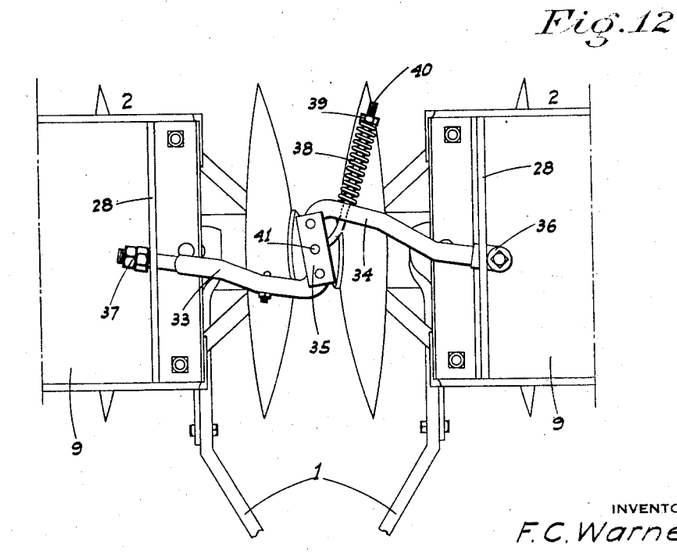
Fig. 12 is a similar view showing the position of the spring break mechanism when the inner ends of the extended harrows tend to raise when disking is being carried out on a ridge.

This improved spring break mechanism is shown clearly in Figs. 10 and 11—Fig. 10 showing the position of the parts when the gangs are level and Fig. 11 showing the position of the parts when the outer ends of the gangs have dropped down and the inner ends have raised.

This spring break mechanism is interposed in the space between the two adjacent flanges 28 at the inner ends of the main gang frames and comprises a pair of working arms 33 and 34 pivotally connected at their inner ends by a link 35, which link normally lies parallel with the inner ends of the working arms 33 and 34 when the gangs are level, as shown in Fig. 10. The arm 34 which projects through one of the flanges 28 has a stop head 36 on its outer end which normally engages the flange 28 when the inner end of the gang tends to rise. The arm 33 has a like stop 37 to engage the opposite flange 28, and the arms 33 and 34 are freely slidable through the flanges 28 to allow unrestricted movement of the gangs back to level position and to allow the arms 33 and 34 of the link 35 to also be pulled to the normal position shown in Fig. 10, by the action of a spring 38. This spring 38 is interposed between the arm 34 and a stop head 39 on a rod 40, which rod is preferably curved and extends through the arm 34 to a pivotal connection substantially midway of the link 35 as at 41. The stop 37 may be an adjustment nut mounted on a threaded end of the arm 33 to so adjust the parts that the action of the spring 38 will definitely bring the spring break parts back to the normal position shown in Fig. 10 each time the gangs return to level position, after having dropped down on a ridge or other uneven ground surface.

When, however, the outer ends of the gangs do drop down and lift the inner ends thereof, the canting of the flanges 28 will engage the stops 36 and 37 and pull the link 35 away from normal position approaching a position at right-angles thereto, depending on the extent of drop of the gangs, full extended position being shown in Fig. 11. As the gangs drop, the tension of the spring 38 will of course be increased, thus tending to prevent undue raising of the inner ends of the gang and also placing the spring under tension necessary to return the spring break parts back to normal position as the gangs again move to level position.

From the foregoing specification it will be observed that I have described the present and preferred form of my invention in considerable detail. However, in actual practice it will be readily understood that certain deviations from such specific detail may be resorted to without departing from the spirit of the invention as defined in the accompanying claims.

Having thus described my invention, what I claim as new and useful and desire to secure by Letters Patent is:

1. In a disk harrow, a sectionalized harrow unit comprising a main gang and an extension gang detachably connected together, the connecting means comprising a substantially horizontally disposed pin on one gang frame, a substantially vertically disposed notch formed in the other gang frame, a substantially horizontally disposed notch formed in the first named frame and a headed pin mounted substantially vertically on the second named frame, the pins being adapted to project into the notches when the gangs are connected in operative relation.

2. In a disk harrow, a sectionalized harrow unit comprising a main gang and an extension gang detachably connected together, the connecting means comprising a substantially horizontally disposed pin on one gang frame, a substantially vertically disposed notch formed in the other gang frame, a substantially horizontally disposed notch formed in the first named frame and a headed pin mounted substantially vertically on the second named frame, the pins being adapted to project into the notches when the gangs are connected in operative relation, and means to lock the gangs in such operatively connected relationship.

3. In a disk harrow, a sectionalized harrow unit comprising a main gang and an extension gang detachably connected together, the connecting means comprising a substantially horizontally disposed pin on one gang frame, a substantially vertically disposed notch formed in the other gang frame, a substantially horizontally disposed notch formed in the first named frame and a headed pin mounted substantially vertically on the second named frame, the pins being adapted to project into the notches when the gangs are connected in operative relation, and means to lock the gangs in such operatively connected relationship, such locking means comprising a latch and a latch pin, the two frames having orifices which register together when the gangs are connected, and the latch pin being adapted to project through such registering orifices to lock the frames together.

4. In a disk harrow, a sectionalized harrow unit comprising a main gang and an extension gang detachably connected together, and means to allow partial separation of the gangs, the extension gang being then adapted to be rocked vertically and then moved along the top of the main gang and brought to rest in any selected position on such main gang.

5. In a disk harrow, a sectionalized harrow unit comprising a main gang and an extension gang detachably connected together, and means to allow partial separation of the gangs, the extension gang being then adapted to be rocked vertically and then moved along the top of the main gang and brought to rest in any selected position on such main gang, and means to then prevent retrograde movement of the extension gang on the main gang.

6. In a disk harrow, a sectionalized harrow unit comprising a main gang and an extension gang detachably connected together, and means to allow partial separation of the gangs, the extension gang being then adapted to be rocked vertically and then moved along the top of the main gang and brought to rest in any selected position on such main gang, and means to then prevent retrograde movement of the extension gang on the main gang, such means comprising a locking bar pivoted to the main frame and overweighted to normally hold one end of the bar above the frame in the path of the disks on the extension gang, the other end of the bar being notched to project into the path of and obstruct the passage of a disk when any other disk moves against and depresses such normally projecting end of the bar.

7. In a disk harrow, a sectionalized harrow unit comprising a main gang and an extension gang detachably connected together, and means to allow partial separation of the gangs, the extension gang being then adapted to be rocked vertically and then moved along the top of the main gang and brought to rest in any selected position on such main gang, such means including rollers associated with the extension gang frame and adapted to engage and roll along the top and bottom of the main disk frame as the extension gang is moved therealong.

8. In a disk harrow, the combination of two oppositely extending disk gangs, means for yieldingly resisting relative movement between the inner ends of the gangs, such means including arms movable through the gang frames, a link connecting the inner ends of the arms and normally lying parallel with both arms, and a yieldable element normally resisting relative movement of the arms and link.

9. In a disk harrow, the combination of two oppositely extending disk gangs, means for yieldingly resisting relative movement between the inner ends of the gangs, such means including arms movable through the gang frames, a link connecting the inner ends of the arms and normally lying parallel with both arms, a rod pivotally connected with the link and projecting past one arm, and a spring interposed between stops on the arm and on the outer end of the rod.

10. A sectionalized disk harrow comprising a main disk gang and an extension disk gang, the frame of the extension gang being adapted for endwise sliding movement onto the frame of the main gang to a predetermined position, and to be then rocked laterally to a vertical position about one side as a substantial axis, and elements on the frames on said one side to cooperate when the extension gang frame is in said position to guide and locate the extension frame during such rocking movement; the extension gang frame when thus rocked being adapted for further movement along the main disk gang to a selected position thereon.

11. A sectionalized disk harrow comprising a main disk gang and an extension disk gang, the frame of the extension gang being adapted for endwise sliding movement onto the frame of the main gang to a predetermined position, and to be then rocked laterally to a vertical position about one side as a substantial axis, and elements on the frames on said one side to cooperate when the extension gang frame is in said position to guide and locate the extension frame during such rocking movement; and rollers on the said one side of the extension gang frame positioned to then ride on the adjacent side of the main gang frame to facilitate further movement of the extension gang frame along the main gang frame.

FREDERICK C. WARNE.